United States Patent
Lev et al.

(10) Patent No.: US 12,342,083 B2
(45) Date of Patent: Jun. 24, 2025

(54) FILTERING A STREERABLE LASER BEAM DURING REAL-TIME OBJECT DETECTION AND TARGETING IN PHYSICAL SPACE

(71) Applicant: NEC Corporation Of America, Herzlia (IL)

(72) Inventors: Tsvi Lev, Tel-Aviv (IL); Yaacov Hoch, Ramat-Gan, IL (US); Hagai Har-Gil, Ramat Gan (IL)

(73) Assignee: NEC Corporation Of America, Herzlia (IL)

( * ) Notice: Subject to any disclaimer, the term of this patent is extended or adjusted under 35 U.S.C. 154(b) by 23 days.

(21) Appl. No.: 18/199,991

(22) Filed: May 22, 2023

(65) Prior Publication Data

US 2024/0397207 A1   Nov. 28, 2024

(51) Int. Cl.
| | | |
|---|---|---|
| H04N 23/00 | (2023.01) | |
| G06T 5/00 | (2024.01) | |
| G06T 5/20 | (2006.01) | |
| G06T 5/77 | (2024.01) | |
| H04N 23/11 | (2023.01) | |
| H04N 23/56 | (2023.01) | |
| H04N 23/61 | (2023.01) | |
| H04N 23/74 | (2023.01) | |
| H04N 23/81 | (2023.01) | |
| G03B 17/17 | (2021.01) | |

(52) U.S. Cl.
CPC ............. *H04N 23/74* (2023.01); *G06T 5/20* (2013.01); *G06T 5/77* (2024.01); *H04N 23/11* (2023.01); *H04N 23/56* (2023.01); *H04N 23/61* (2023.01); *H04N 23/81* (2023.01); *G03B 17/17* (2013.01)

(58) Field of Classification Search
CPC ........ H04N 23/74; H04N 23/61; H04N 23/56; H04N 23/11; H04N 23/81; G06T 5/77; G06T 5/20; G03B 17/17
See application file for complete search history.

(56) References Cited

U.S. PATENT DOCUMENTS

| | | | | |
|---|---|---|---|---|
| 2006/0033813 A1* | 2/2006 | Provinsal | ............... | H04N 7/181 |
| | | | | 348/E7.086 |
| 2008/0192981 A1* | 8/2008 | Murphy | .................. | A63J 99/00 |
| | | | | 382/103 |
| 2009/0050806 A1* | 2/2009 | Schmidt | ................. | H04N 23/45 |
| | | | | 250/332 |
| 2009/0066916 A1* | 3/2009 | Brown | .................... | G03B 21/28 |
| | | | | 353/121 |
| 2009/0073307 A1* | 3/2009 | Kramer | ................ | H04N 5/2625 |
| | | | | 348/E5.022 |
| 2014/0078383 A1* | 3/2014 | Schmaelzle | ............ | G03B 15/02 |
| | | | | 348/E5.026 |

(Continued)

*Primary Examiner* — Zhihan Zhou (57) ABSTRACT

There is provided a system for guiding a steerable laser to a target object, comprising: at least one processor executing a code for: for each image of a plurality of images captured by an image sensor and obtained in a plurality of iterations: filtering an illumination of a steerable laser overlapping a target object or in near proximity to a target object from the image, to create a filtered image, detecting the target object on the filtered image by a detector model, and generating instructions for at least one of: further directing of the steerable laser for illumination of the target object, and maintaining the illumination of the steerable on the target object.

17 Claims, 4 Drawing Sheets

(56) References Cited

U.S. PATENT DOCUMENTS

| | | | |
|---|---|---|---|
| 2014/0139654 A1* | 5/2014 | Takahashi | G06V 10/245 |
| | | | 348/61 |
| 2015/0023019 A1* | 1/2015 | Chen | H05B 45/00 |
| | | | 362/276 |
| 2016/0100101 A1* | 4/2016 | Cohen | H04N 23/632 |
| | | | 348/207.1 |
| 2017/0374342 A1* | 12/2017 | Zhao | G06T 7/579 |
| 2019/0268521 A1* | 8/2019 | Asano | H04N 23/73 |
| 2019/0271841 A1* | 9/2019 | Hwang | G02C 7/105 |
| 2020/0363619 A1* | 11/2020 | Nikitin | G02B 21/0064 |
| 2023/0079240 A1* | 3/2023 | Song | G01S 7/4863 |
| | | | 356/5.01 |
| 2023/0169656 A1* | 6/2023 | Vo-Dinh | G06V 10/25 |
| | | | 382/128 |
| 2023/0300483 A1* | 9/2023 | Price | H04N 9/646 |
| | | | 348/207.99 |
| 2024/0080557 A1* | 3/2024 | Perugini | H04N 23/74 |
| 2024/0117947 A1* | 4/2024 | de Mersseman | F21S 41/657 |

\* cited by examiner

# FILTERING A STREERABLE LASER BEAM DURING REAL-TIME OBJECT DETECTION AND TARGETING IN PHYSICAL SPACE

FIELD AND BACKGROUND OF THE INVENTION

The present invention, in some embodiments thereof, relates to control of a steerable laser, and more specifically, but not exclusively, to systems and methods for guiding a steerable to a target object.

Steerable lasers are widely used in a diverse set of technologies, including projectors, gaming systems, LIDARs and defense-oriented systems. In such applications, a user may generally direct the laser to the target object, for example, a wall, or a far object to which distance is to be measured, and the laser is locally steered, for example, to "write" words on the wall and/or measure the distance to the object.

SUMMARY OF THE INVENTION

According to a first aspect, a system for guiding a steerable laser to a target object, comprises: at least one processor executing a code for: for each image of a plurality of images captured by an image sensor and obtained in a plurality of iterations: filtering an illumination of a steerable laser overlapping a target object or in near proximity to a target object from the image, to create a filtered image, detecting the target object on the filtered image by a detector model, and generating instructions for at least one of: further directing of the steerable laser for illumination of the target object, and maintaining the illumination of the steerable on the target object.

According to a second aspect, a method of guiding a steerable laser to a target object, comprising: for each image of a plurality of images captured by an image sensor and obtained in a plurality of iterations: filtering an illumination of a steerable laser overlapping a target object or in near proximity to a target object from the image, to create a filtered image, detecting the target object on the filtered image by a detector model, and generating instructions for at least one of: further directing of the steerable laser for illumination of the target object, and maintaining the illumination of the steerable on the target object.

According to a third aspect, a non-transitory medium storing program instructions for guiding a steerable laser to a target object, which when executed by at least one processor, cause the at least one processor to: for each image of a plurality of images captured by an image sensor and obtained in a plurality of iterations: filter an illumination of a steerable laser overlapping a target object or in near proximity to a target object from the image, to create a filtered image, detect the target object on the filtered image by a detector model, and generate instructions for at least one of: further directing of the steerable laser for illumination of the target object, and maintaining the illumination of the steerable on the target object.

In a further implementation form of the first, second, and third aspects, the illumination of the steerable laser overlapping the target object or in near proximity to the target object depicted in the image reduces confidence of the detector model's detection of the target object in comparison to confidence of detection of the target object in an image that excludes the illumination and/or in which the illumination is non-overlapping the target object and is not in near proximity to the target object.

In a further implementation form of the first, second, and third aspects, confidence of the detector model's detection of the target object in the filtered image is higher than confidence of the detector model's detection of the target object in the image prior to the filtering.

In a further implementation form of the first, second, and third aspects, further comprising the steerable laser and the image sensor.

In a further implementation form of the first, second, and third aspects, the at least one processor, the steerable laser, and the image sensor are installed on a helmet in a fixed position with no relative movement between the steerable laser and the image sensor.

In a further implementation form of the first, second, and third aspects, the at least one processor and the image sensor are of a smartphone, the steerable laser is on a back of the smartphone where the image sensor is installed, and further comprising a prism oriented for capturing images by the image sensor that are aligned with a beam generated by the steerable laser.

In a further implementation form of the first, second, and third aspects, further comprising code for dynamically reducing intensity of the illumination of the laser to a level that remain visible to a human eye to detect and in which the detector model detects the target object in images depicting the reduced intensity of illumination with a confidence above a threshold.

In a further implementation form of the first, second, and third aspects, further comprising a notch filter set to an emission band of the steerable laser, the notch filter placed in an optical path from the target object to the image sensor.

In a further implementation form of the first, second, and third aspects, further comprising code for: activating the steerable laser for illumination when a first image depicting the illumination is being captured, analyzing a location of the illumination depicted in the first image for tracking a current location of the steerable laser and/or for feedback in controlling the steerable laser, and non-activating the steerable laser when a second image is being captured, wherein the filtered image is created from the second image for analysis by the detector model.

In a further implementation form of the first, second, and third aspects, non-activating comprises reducing intensity of the steerable laser to a level that remains visible to a human eye and that increases confidence of the detector model above a value for images with higher intensity of the steerable laser.

In a further implementation form of the first, second, and third aspects, analyzing the location of the illumination comprises registering the first image with the second image, and comparing the location of the illumination depicted in the first image with the location of the target object detected in the second image, for determining whether the illumination corresponds to the expected orientation of the steerable laser.

In a further implementation form of the first, second, and third aspects, further comprising code for detecting the illumination within the image, and creating the filtered image by digitally removing the detected illumination.

In a further implementation form of the first, second, and third aspects, the illumination generates a preset pattern, and detecting the illumination comprises detecting the preset pattern.

In a further implementation form of the first, second, and third aspects, the detected illumination is removed by replacing pixel values depicting the illumination with pixel values representing background behind the illumination, obtained by at least one of: extrapolating from pixels around the illumination that represent background, and from a location on a preceding image corresponding to the illumination on the image, the preceding image obtained prior to the steerable laser directed to illumination at a current location.

In a further implementation form of the first, second, and third aspects, further comprising code for: predicting a future location of the illumination to be depicted in a future image, extracting pixel values from a current location of a current image corresponding to the future location of the illumination, wherein the pixel values at the current location exclude the illumination, obtaining the future image, and creating the filtered image by replacing pixels corresponding to the future location of the future image with the extracted pixel values.

In a further implementation form of the first, second, and third aspects, the steerable laser illuminates within a first wavelength range, and the image sensor captures images at a second wavelength that is non-overlapping with the first wavelength.

In a further implementation form of the first, second, and third aspects, the first wavelength range is within the visible light range, and the second wavelength range is within at least one of near infrared (NIR) and short wave infrared (SWIR).

In a further implementation form of the first, second, and third aspects, the steerable laser illuminates within a wavelength range of a color within the visible light range, and further comprising a filter that filters the wavelength range of the color, the filter positioned for filtering light on a path from the target object to the image sensor, and wherein the detector model is designed and/or trained for processing images that exclude the wavelength range of the color.

In a further implementation form of the first, second, and third aspects, further comprising code for inversely-synchronizing the image sensor and the steerable laser, by modulating the steerable laser for activating the steerable laser when the image sensor is not capturing the image and non-activating the steerable laser when the image sensor is capturing the image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to control of a steerable laser, and more specifically, but not exclusively, to systems and methods for guiding a steerable laser to a target object.

An aspect of some embodiments of the present invention relates to systems, methods, computing devices, and/or code instructions (stored on a data storage device and executable by one or more processors) for guiding a steerable laser to a target object. The steerable laser is used, for example, to point-out the target object in a scene (e.g., installed in a helmet worn by a human), and/or to direct a vehicle (e.g., autonomous, robot) to the target object. For each image of multiple images obtained in iterations, a processor creates a filtered image by filtering an illumination of a steerable laser overlapping a target object or in near proximity to a target object from the image. The target object is detected on the filtered image by a detector model. The filtered image may increase performance of the detector model in comparison to performance of the detector model analyzing the non-filtered image with depicted illumination, since the illumination which may be brighter than the target object may act as an artifact that reduces performance of detection. The processor generates instructions for further directing of the steerable laser for illumination of the target object, and/or for maintaining the illumination of the steerable on the target object. For example, for maintaining pointing-out of the target object, and/or directing the vehicle to the target object.

At least some implementations of the systems, methods, computing devices, and/or code instructions (stored on a data storage device and executable by one or more processors) address the technical problem of image guided control of a steerable laser to a target object. At least some implementations of the systems, methods, computing devices, and/or code instructions described herein improve the technical field of image guided control of a steerable laser to a target object.

At least some implementations of the systems, methods, computing devices, and/or code instructions described herein address the technical problem of increasing confidence of a detector model that detects a target object in an image, in an environment in which the detected target object is used to guide the steerable laser to the target object.

At least some implementations of the systems, methods, computing devices, and/or code instructions described herein improve the technical field of detector models that detects a target object in an image, in an environment in which the detected target object is used to guide the steerable laser to the target object.

Images of a scene which are captured by an image sensor, are analyzed by a detector model to identify the target object. A steerable laser is guided to the detected target object. Now, as the steerable laser is advanced closer to the target object, and/or is directed towards the target object, the illumination of the laser appears in near proximity to the object and/or the illumination appears on the object itself (i.e., overlapping the object). For example, the illumination may appear as a bright spot that obscures the field of view behind the illumination and/or in near proximity to the illumination. The illumination of the laser depicted within the images reduces the detector model's confidence of detecting the target object, in comparison to the detector model's confidence of detecting the target object in images that exclude the illumination of the laser.

At least some implementations of the systems, methods, computing devices, and/or code instructions described herein improve the aforementioned technical problem, and/or improve the aforementioned technical field, by filtering the illumination of the steerable laser from subsequent images that depict the target object. Filtering the illumination from the images increases the confidence of detection of the target object by the detector model, which may enable more accurate control of the steerable laser to the target object. One or more exemplary approaches to filtering the illumination from the images are described herein.

At least some implementations of the systems, methods, computing devices, and/or code instructions described herein improve over existing approaches to control of steerable lasers. In such prior approaches, the control of the steerable laser is not coupled to detection of target objects in images. For example, steerable lasers are widely used in a diverse set of technologies, including projectors, gaming systems, LIDARs and defense-oriented systems. In such applications, a user may generally direct the laser to the target object, for example, a wall, or a far object to which distance is to be measured, and the laser is locally steered, for example, to "write" words on the wall and/or measure the distance to the object. In another example, virtual reality (VR) and mixed reality (MR) systems may be equipped with a camera and may project images on some surface, but they don't "detect" the image they produce, and/or filter it out. There is no laser that is steered according to an analysis of the images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
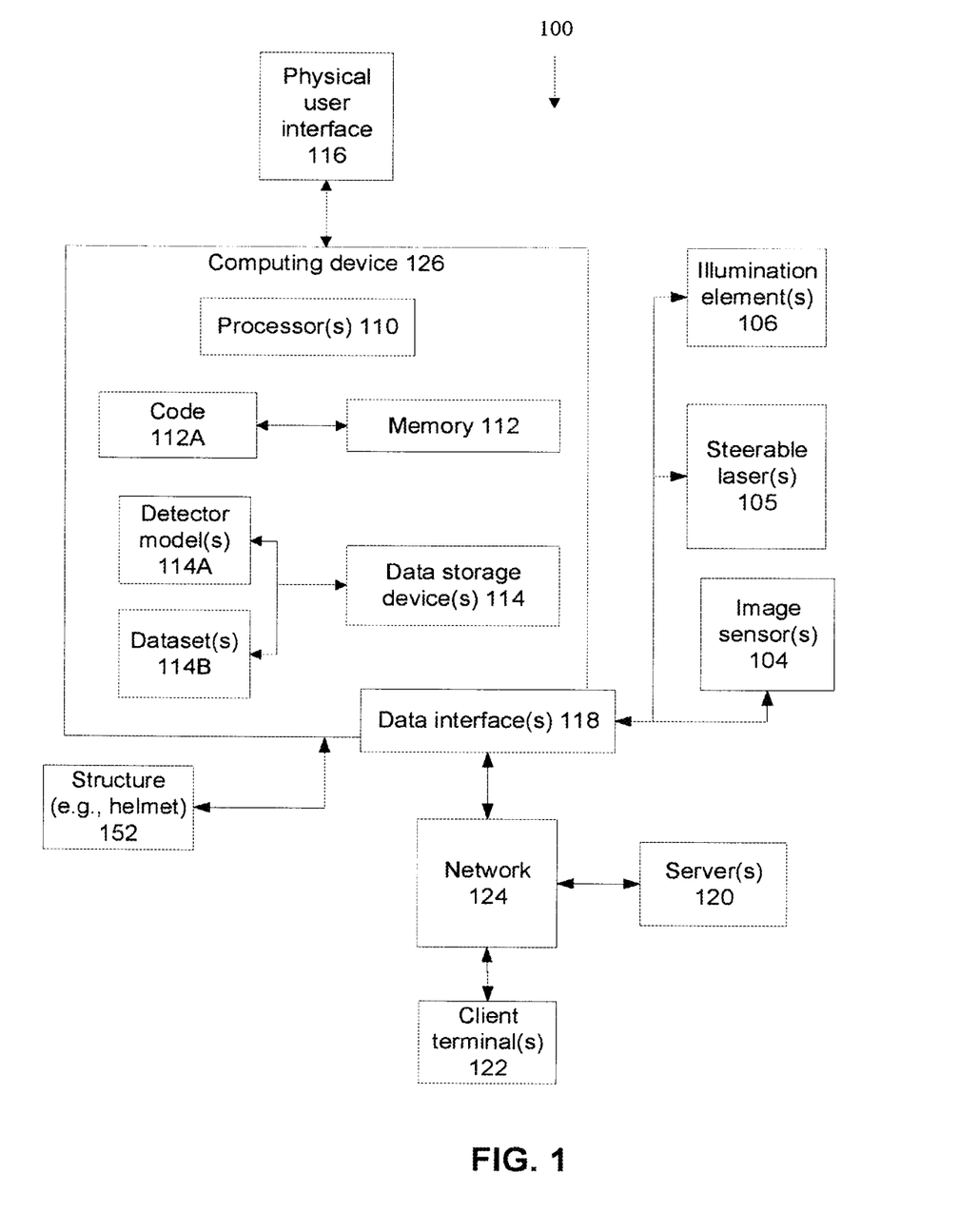
FIG. 1 is a schematic of a block diagram of components of a system for controlling a steerable laser according to an analysis of images captured by one or more images sensor(s) in which an illumination by laser is filtered out, in accordance with some embodiments of the present invention.
Figure 2:
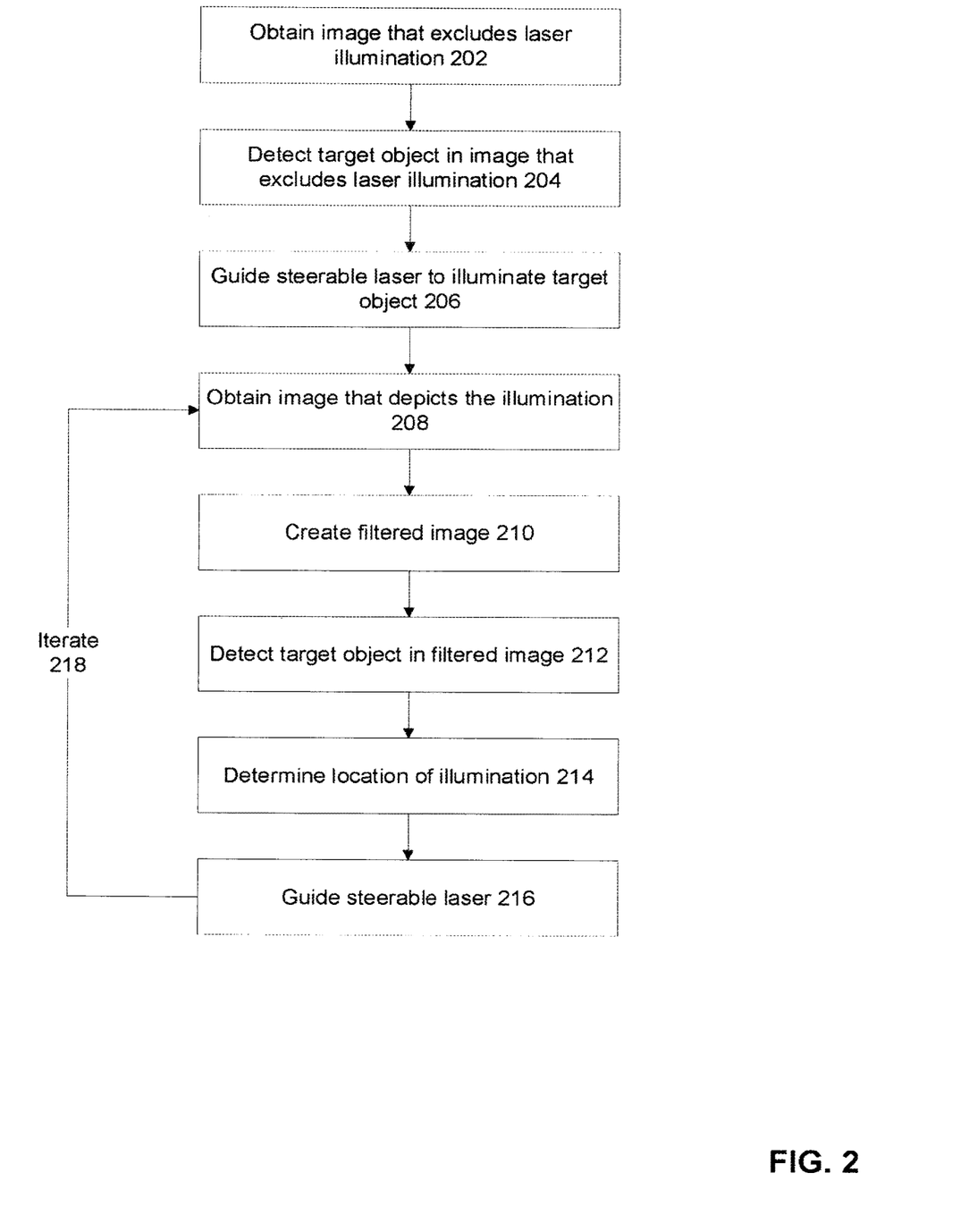
FIG. 2 is a flowchart of a method for filtering images depicting illumination by a steerable laser for detecting a target object for guiding the steerable laser, in accordance with some embodiments of the present invention.
Figure 3:
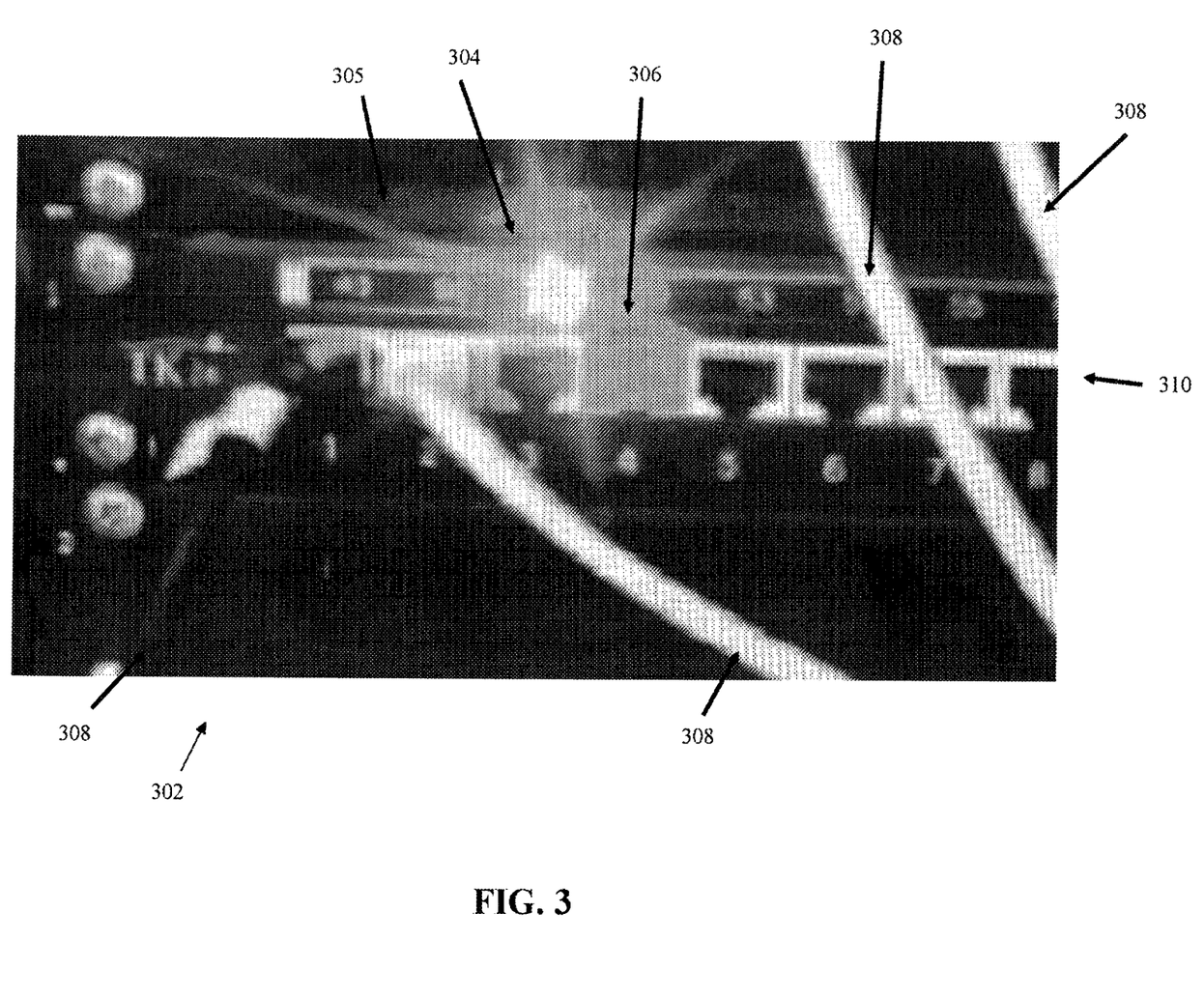
FIG. 3 is an image captured by a camera in which an illumination by a steerable laser reduces confidence of a detector model's detection of a target object, in accordance with some embodiments of the present invention.
Figure 4:
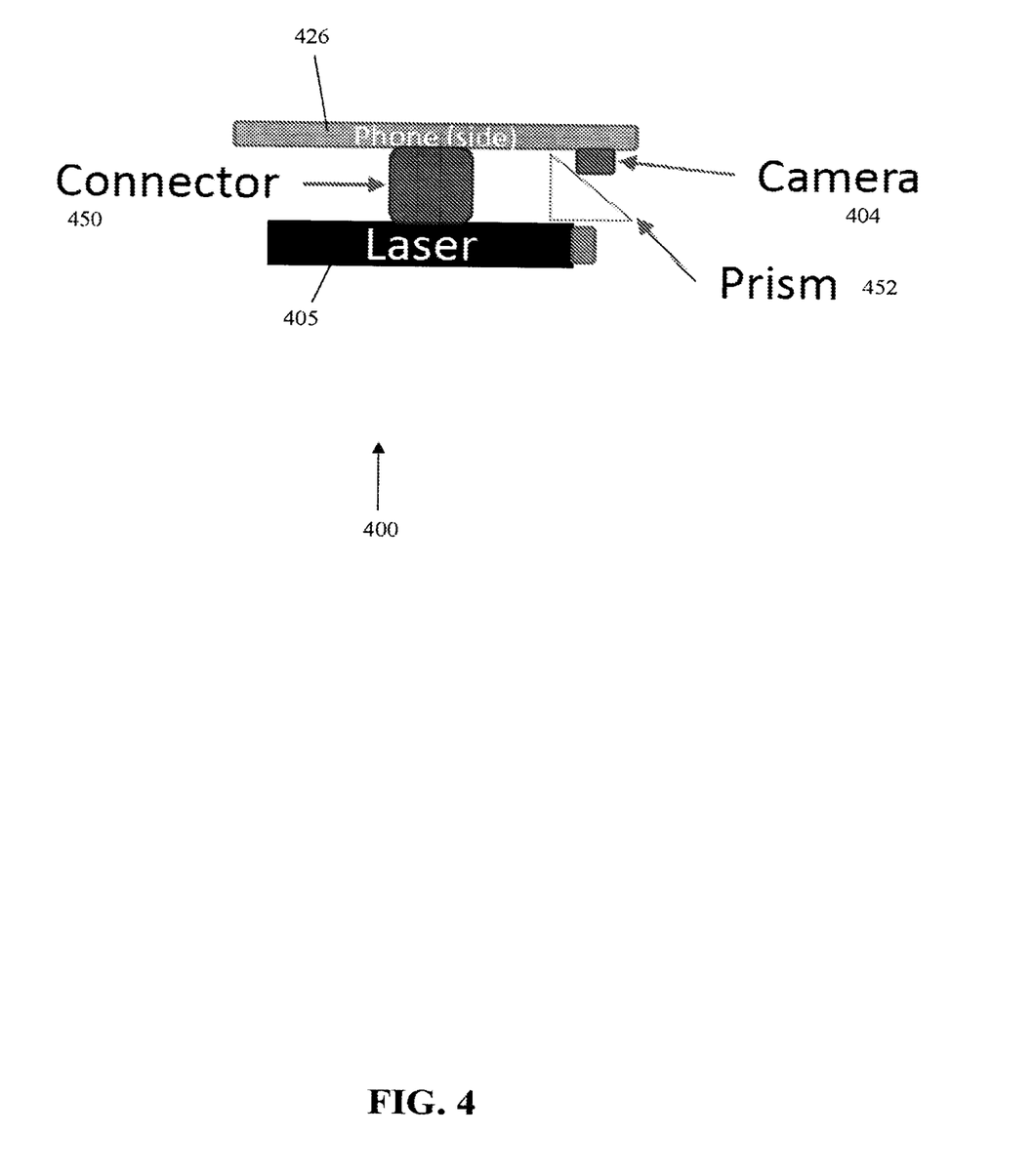
FIG. 4 is a schematic of an exemplary implementation of a portable device that includes a steerable laser installed on a smartphone, in accordance with some embodiments of the present invention.

Reference is now made to FIG. 1, which is a schematic of a block diagram of components of a system 100 for controlling a steerable laser 105 according to an analysis of images captured by one or more images sensor(s) 104 in which an illumination by laser 105 is filtered out, in accordance with some embodiments of the present invention. Reference is also made to FIG. 2, which is a flowchart of a method for filtering images depicting illumination by a steerable laser for detecting a target object for guiding the steerable laser, in accordance with some embodiments of the present invention. Reference is also made to FIG. 3, which is an image 302 captured by a camera in which an illumination 304 by a steerable laser 305 reduces confidence of a detector model's detection of a target object 306, in accordance with some embodiments of the present invention. Reference is also made to FIG. 4, which is a schematic of an exemplary implementation of a portable device 400 that includes a steerable laser 405 installed on a smartphone 426, in accordance with some embodiments of the present invention.

System 100 may implement the acts of the method described with reference to FIGS. 2-4, by processor(s) 110 of a computing device 126 executing code instructions (e.g., code 112A) stored on a memory 112.

Processor(s) 110 of computing device 126 feed an image captured by image sensor(s) 104 into a detector model(s) 114A that detects a target object in the image. Processor(s) 110 generate instructions for directing a steerable laser 105 for illuminating the detected target object. The images fed into detector model(s) 114A are filtered using one or more approaches described herein, for reducing or eliminating the illumination of steerable laser 105 depicted in the image, for increasing the confidence of detection by detector model(s) 114A, as described herein.

Optionally, computing device 126, steerable laser 105, and image sensor(s) 104 are installed on a structure 152, for example, a helmet, a wearable garment (e.g., glasses, hat), robot, vehicle (e.g., car, motorcycle), autonomous vehicle, and the like. In some embodiments, computing device 126 is implemented as a portable device, for example, a smartphone as described with reference to FIG. 4.

Imaging sensor(s) 104 capture images at one or more wavelengths, for example, one or more ranges within the visible light spectrum, ultraviolet (UV), infrared (IR), near infrared (NIR), and the like. Examples of imaging sensor(s) 104 include a camera and/or video camera and/or a pan-tilt-zoom (PTZ) camera, such as CCD, CMOS, and the like. Imaging sensor(s) 104 may be implemented as, for example, a short wave infrared (SWIR) sensor that captures SWIR image(s) at a SWIR wavelength. Examples of SWIR sensor(s) 104 include: Plasmon based CMOS, bolometer array based FIR, and 3D passive imaging.

Steerable laser 105 is a laser that is controllable, to direct the beam to specific locations. Steerable laser 105 may be rapidly changed, for example, for "writing" and/or "drawing" on a wall. Steerable laser 105 may illuminate at a wavelength range that is visible to the human eye. Steerable lasers may have different implementations based on different on technologies, for example, galvanometric mirrors, MEMS (micro-electromechanical system), EOM (electro-optic modulator) and AOMs (acousto-optics modulator). Wavelengths range from ultraviolet (UV) (~300 nanometers (nm)) to the infrared (IR), i.e., above about 1000 nm.

Optionally, system 100 may include one or more illumination elements 106 that generate electromagnetic illumination at a selected electromagnetic frequency range that is captured by imaging sensor(s) 104, for example, one or more ranges within the visible light spectrum (e.g., white or one or more colors), ultraviolet (UV), infrared (IR), near infrared (NIR), SWIR, and the like.

Computing device 126 may be implemented as for example, one or more and/or combination of: a standalone component (e.g., within a housing) that can be connected to structure 152, a group of connected devices, a client terminal, a server, a computing cloud, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Computing device 126 includes one or more processor(s) 110, which may interface with imaging sensor(s) 104 for receiving image(s) that include the target objects(s) and/or with steerable laser(s) 105 for directing the illumination of the laser to the detected target object. Processor(s) 110 may interface with other components, described herein. Processor(s) 110 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

Computing device 126 includes a memory 112, which stores code 112A for execution by processor(s) 110. Code 112A may include program instructions for implementing one or more features of the method described with reference to FIGS. 2-4, as described herein. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 126 may include a data storage device(s) 114, which may store data, for example, detector model(s) 114A and/or one or more datasets 114B, for example, of captured images, filtered images, and/or other indications of detected objects. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

Computing device 126 may include a physical user interface 116 that includes a mechanism for user interaction, for example, to enter data and/or to view data. Exemplary physical user interfaces 116 include, for example, one or more of, a touchscreen, a display, gesture activation devices, a keyboard, a mouse, and voice activated software using speakers and microphone.

Computing device 126 may include one or more data interfaces 118 for providing communication with one or more of: image sensor(s) 104, steerable laser(s) 105, illumination element(s) 106, and/or other external devices (e.g., server(s) 120 and/or client terminal(s) 122) optionally over a network 124. Data interface 118 may be implemented as, for example, one or more of, a network interface, a vehicle data interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

Network 124 may be implemented as, for example, the internet, a broadcast network, a local area network, a virtual network, a wireless network, a cellular network, a local bus, a point to point link (e.g., wired), and/or combinations of the aforementioned. It is noted that a cable connecting processor(s) 110 and another device may be referred to herein as network 124.

System 100 may be implemented as different architectures. For example, in a server-client architecture, computing device 126 is implemented as a server that receives images of fields of view depicting target objects captured by imaging sensor(s) 104 from a client terminal 122 over network 124, for example, a smartphone with camera. Computing device 126 filters the images as described herein, and determines the location of the target object. The location and/or filtered image may be provided to the client terminal, for directing a local steerable laser 105, for example, installed on the smartphone as described herein. In another example, computing device 126 generates instructions for guiding the local steerable laser 105, and sends the instructions to client terminal 122. In an example of a local architecture, computing device 126 is implemented as a local computer, optionally smartphone, that receives images captured by imaging sensor(s) 104 (e.g., camera of the smartphone), locally computes the location as described herein, and controls laser 105 (e.g., installed on the smartphone), as described herein.

In some implementations, laser 105 and image sensor(s) 104 are installed on a common object, for example, installed on a helmet in a fixed position with no relative movement between the steerable laser and the image sensor. The helmet can be worn by a user, where the laser is automatically steered to the target object to visually mark the target object to the user, as described herein. Computing device 126 may be installed on the object. Alternatively, laser 105 and image sensor(s) 104 are in communication with a remote computing device 126, for example, a smartphone via short range connections (e.g., Bluetooth).

In other implementations, laser 105 and image sensor(s) 104 are installed separately. In such implementations, the guiding of steerable laser 105 is dynamically corrected according to the currently detected position of the illumination.

Referring now back to FIG. 4, portable device 400 that includes steerable laser 405 installed on smartphone 426, is depicted. Smartphone 426 includes the processor, memory, and code, as described herein, for locally analyzing images and/or controlling laser 405, and/or for communicating with a remote server, as described herein. Camera (i.e., image sensor) 404 is installed within smartphone 426. Steerable laser 405 is installed is on a side smartphone 426, optionally connected by a connector 450, for example, glue, welding, snap connector, and the like. Steerable laser 405 may be installed on the side of smartphone 426, optionally the back, where camera 404 is located. An optical element 452, optionally a prism, is oriented for capturing images by camera 404 that are aligned with a beam generated by the steerable laser 405.

It is noted that smartphone 426 is an example and not necessarily limiting. For example, a tablet and/or other devices may be used.

Referring now back to FIG. 2, features described with reference to 202-206 represent the state in which the illumination does not significantly impact confidence of a detector's model detection of a target object in an image. For example, an initial state, prior to activation of illumination by the steerable laser, and/or prior to location of the illumination overlapping a target object and/or in near proximity to the target object.

At 202, an image captured by an image sensor is accessed. The image depicts a target object within a field of view. The target object is for being illuminated by a steerable laser. The object may be static or dynamic (i.e., moving), human, animal, or inanimate. For example, a port for connection of a cable, a specific identified human, a dog running around, a statue, a parked vehicle, a moving vehicle, and the like.

The image sensor may be a video camera that iteratively captures images as frames at a frame rate.

At 204, the location of the target object within the image is detected, by being fed into a detector model. The detection is performed to enable directing a steerable laser towards the target object, for example, coordinates in a space of the target object are computed based on coordinates and/or pose of the image sensor.

The detector model may be implemented as, for example, a machine learning model trained on images labelled with a ground truth indication of sample target objects, such as by marking a boundary around the sample target objects. The ML model may be implemented as, for example, a neural network (e.g., convolutional, fully connected, deep, encoder-decoder, transformer), and/or other suitable architecture, for example, that analyze features extracted from images. Non-ML model architectures may be used, for example, based on identification of features and/or template matching.

Optionally, the detector model generates an indication of a confidence of the detection of the target object within the image, for example, a probability value. The confidence of the detection is impacted by the presence or absence and/or intensity of illumination of the steerable laser, as described herein.

At 206, instructions for guiding the steerable laser to illuminate the detected target object are generated. The steerable laser is guided towards the target object (i.e., change in location of the illumination), and/or the pattern of illumination may be adapted (e.g., at the same location and/or different location). For example, the angle of the steerable laser is adapted according to the detected location of the target object. The guidance of the steerable laser to the target object may be in a sweeping motion, from its current location along a path to the target object, and/or the guidance may be in a step, from its current location directly to the target object without intermediate illumination. In another example, when the steerable laser is illuminating the field of view at a location other than the target object, the pattern of the steerable laser is a question mark (?), and when the steerable laser is illuminating the target object the shape of illumination is changed to a checkmark (✓).

The steerable laser illuminates at a wavelength(s) within the visible spectrum, to enable a human to see the illumination on the object. The size and/or intensity and/or pattern of illumination may be selected to enable the human to clearly see the illumination on the object. The intensity of illumination may be adapted, as described herein. The steerable laser may illuminate with a pattern by fast sweeping of the laser, for example, "writing" words, "drawing" a shape (e.g., arrow, dot, image), and the like.

The illumination of the target object may be for visually marking the target object to a human. For example, to help the human identify a specific object from many other nearby objects. The illumination of the target object may be for visually marking the target object to another automated processor, for example, a robot. For example, in a restaurant, images of the restaurant may be analyzed to detect which glasses are low on drink or where the customers have finished their drinks. The laser may be directed to those glasses. A robot that automatically refills the glasses may search for the laser illumination indicating which glasses are to be re-filled.

At 208, an image depicting the illumination of the steerable laser overlapping the target object and/or in near proximity to the target object is accessed. It is noted that the image of 208 depicts the illumination, which is different from the image of 202 that does not depict the illumination.

At 210, the image is filtered to create a filtered image. The filtering is performed for reducing or removing the illumination of the steerable laser that overlaps the target object and/or is in near proximity to the target object from the image.

One or more filtering approaches may be applied. Some exemplary approaches are now described.

In one approach, the intensity of the illumination of the steerable laser is reduced to a level that remain visible to a human eye to detect and in which the detector model detects the target object in images depicting the reduced intensity of illumination with a confidence above a threshold. The reduced intensity level is selected to both enable a human to see the illumination on the target object without significantly compromising the detector's confidence of detecting the target object with the illumination depicted in the image. The intensity of the illumination may be dynamically adapted, for example, iteratively reduced until the detector model's confidence falls to just above the threshold while maintaining an intensity that is high enough for a human to see. The reduced intensity that is high enough for the human to see may be determined, for example, during a calibration process and applied in the field, for example, empirical data is collected from a human observer for different combinations of intensity of the laser illumination and environmental light (e.g., ambient light from the sun, artificial light from lamps, projectors, LEDs, and the like). Another ML model and/or image analysis process may evaluate the image depicting the illumination to determine whether the intensity is sufficiently high for the human to see, or whether the intensity has been reduced too much and the human cannot clearly see. Alternatively or additionally, the intensity of the illumination of the steerable laser is increased to a level that remain visible to a human eye to detect and in which the detector model detects the target object in images depicting the reduced intensity of illumination with a confidence above a threshold, for example, in very bright scenes (e.g., mid-day in the desert, under strong floodlights) the intensity of the laser illumination may need to be increased to enable the human to see it.

In another approach, a notch filter is used. The notch filter is set to (e.g., substantially matches, encompasses) an emission band of the steerable laser, for filtering the illumination. The laser illumination may be rendered "invisible" to the image sensor. The notch filter is placed in an optical path from the target object to the image sensor, for example, connected to an optical setup that directs the laser to the target object and/or directs the field of view to the image sensor, and/or a filter placed in front of the image sensor, and/or as a coating on a lens of the image sensor.

In yet another approach, the illumination within the image is detected. The filtered image is created by digitally removing the detected illumination.

Different approaches may be used to detect the illumination, for example, detecting pixels with high intensity (e.g., above a threshold) indicating location of the laser illumination, detecting a high change in neighboring pixel intensity (e.g., difference in intensity between two pixels is above a threshold), and/or using a machine learning model trained to detect the illumination (e.g., trained on images depicting illumination where the ground truth is a demarcation of the illumination). In another example, in implementation in which the illumination generates a preset pattern (e.g., arrow, star, words, pictures), the illumination may be detected by detecting the preset pattern (e.g., using a machine learning model trained to detect the pattern and/or using non-ML model approaches such as feature extraction).

Different approaches may be used for removing the detected illumination. For example, replacing pixel values depicting the illumination with pixel values representing background behind the illumination. The pixel values representing background behind the illumination may be obtained, for example, by extrapolating from pixels around the illumination that represent background, and/or from a location on a preceding image corresponding (e.g., registered) to the illumination on the current image, where the preceding image is obtained prior to the steerable laser directed to illumination at a current location (i.e., when the illumination was not present at the current location, which enables determining what the pixels of the background are).

In yet another approach, a future location of the illumination to be depicted in a future image is predicted. The prediction may be performed, for example, by accessing the instructions that are used for steering the laser. In another example, by extrapolating recent historical motion of the laser to predict where the illumination will be, such as when the illumination is being swept in a straight line. Pixel values may be extracted from a current location of a current image corresponding to the future location of the illumination. The pixel values at the current location exclude the illumination (since the illumination has not yet been guided to that location). When the future image is obtained (i.e., the current image is obtained at the time when the future image was predicted), the filtered image is created by replacing pixels corresponding to the previously determined future location of the future image (which are now being illuminated) with the extracted pixel values (which were obtained prior to the illumination reaching that location).

In yet another approach, the steerable laser illuminates within a first wavelength range, and the image sensor captures images at a second wavelength that is non-overlapping with the first wavelength. The images captured by the image sensor at the second wavelength depict the target object, and exclude the illumination of the laser which is at the first wavelength range. Optionally, the first wavelength range is within the visible light range. The illumination within the visible light range enables a human to see the illumination, for example, for marking the target object. The second wavelength range may be within a near infrared (NIR) and/or short wave infrared (SWIR). The image sensor may not capture at the first wavelength range, for example, the image sensor does not capture at the visible light range. The image sensor may only capture at the first wavelength range, for example, the image sensor only captures at NIR and/or SWIR. Since the laser is illuminating at the first wavelength range (e.g., visible light), the image sensor is unable to capture the laser illumination. Additional processing (e.g., image processing, filtering) to remove the laser illumination from the image is not necessarily required. It is noted that may environments are well lit in the NIR range, so additional lighting may not necessarily be required. The NIR and/or SWIR ranges may sufficiently depict the target object for enabling the detector model to detect the target object with sufficient confidence. Optionally, a second image sensor captures images within the first wavelength range, for example, for detecting the location of illumination which may be used as feedback for correcting the guidance of the steerable laser, as described herein.

In yet another approach, the image sensor and the steerable laser are inversely-synchronized. The steerable laser is modulated for activation when the image sensor is not capturing the image and non-activated when the image sensor is capturing the image. The activation of the steerable laser may be during the time interval after the image sensor has captured the image, when the hardware of the image sensor is processing the captured image and is not capturing another image. Such approach may be used, for example, during high frame rate acquisition implementations.

In yet another approach, the steerable laser illuminates within a wavelength range of a color within the visible light range, for example, red, blue, or green. A filter that filters the wavelength range of the color is positioned for filtering light on a path from the target object to the image sensor. For example, the filter is placed in front and/or on the surface of the image sensor. The image captured by the image sensor excludes the filtered wavelength range of the color. The processor discards the filtered wavelength range of the color and uses the other non-filtered wavelength ranges of the image (e.g., the other visible light wavelength ranges) in the processing. Optionally, the detector model is designed and/or trained for processing images that exclude the filtered wavelength range, for example, the images in the training dataset used for training the detector model exclude the filtered wavelength range.

At 212, the target object is detected on the filtered image by the detector model, for example, as described with reference to 204.

The filtered image is used rather than the non-filtered image to increase the confidence of the detector's model detection of the target object. Confidence of the detector model's detection of the target object in the filtered image is higher than confidence of the detector model's detection of the target object in the image prior to the filtering. When the illumination of the steerable laser overlapping the target object or in near proximity to the target object is depicted in the image, the confidence of the detector model's detection of the target object is reduced in comparison to confidence of detection of the target object in an image that excludes the illumination and/or in which the illumination is non-overlapping the target object and is not in near proximity to the target object.

At 214, the non-filtered image that depicts the illumination may be analyzed to determine the location of the illumination. The location of the illumination may be analyzed relative to the expected location of illumination such as by a controller of the steerable laser. An error between the actual detected location and the expected location may be used to correct the controller of the steerable laser.

Alternatively or additionally, the location of the illumination may be analyzed relative to the location of the detected target object, to determine where the illumination is relative to the target object, for example, overlapping the target object and/or in near proximity to the target object. The filtered image and the non-filtered image may be registered, such that the location of the illumination on the non-filtered image may be determined relative to the location of the target object on the filtered image. The location of the illumination relative to the target object may be tracked, for example, as a feedback mechanism used for guiding the steerable laser to the target object. In another example, the comparison of the location of the illumination between the two images may be used to determine whether the illumination corresponds to the expected orientation of the steerable laser, for example, for error correction of the controller of the steerable laser.

The location of the illumination may be detected, for example, as described with reference to 210.

The filtered and non-filtered images may be based on the same image, i.e., the filtered image is created by filtering the non-filtered image.

Alternatively or additionally, the filtered and non-filtered images may be different images, for example, created by modeling activation of the steerable laser. An exemplary approach is now described. The steerable laser may be activated for illumination when a first image depicting the illumination is being captured. The location of the illumination depicted in the first image is determined. The steerable laser is non-activated when a second image is being captured. The filtered image used to determine the location of the target object is created from the second image. The rate of capture of the first image and the second image may be, for example, by alternating the first and second images, and/or other approaches such as capturing 3 first images and then a second image, or capturing one first image and then 4 second images, or other patterns.

The activation and non-activating of the laser (i.e., amplitude of intensity) may be of different values, for example, on/off (i.e., 100% and 0%). In another example, the non-activation may be obtained by reducing intensity of the steerable laser to a level that remains visible to a human eye and that increases confidence of the detector model above a value for images with higher intensity of the steerable laser. For example, to 30% of intensity amplitude, or 20%, or 10%, or other values. Activation may be, for example, 100%, or 90%, or 80%, or 70%, or 60% of intensity amplitude, or other values.

Alternatively or additionally, the filtered and non-filtered images may be of different wavelengths, for example, the filtered images are in NIR and/or SWIR and the non-filtered images are in the visible light spectrum, as described herein.

At 216, instructions for further directing of the steerable laser to illumination of the target object, and/or maintaining the illumination of the steerable on the target object may be generated, for example, as described with reference to 206. The instructions are implemented by the steerable laser, for example, by the controller.

In implementations in which the laser and image sensor(s) are separately installed, without necessarily being in a fixed position relative to one another, the determined location of the illumination may be used to dynamically correct the pose of the steerable laser.

At 218, features described with reference to 208-216 are iterated for multiple images, for example, for frames of a video captured by the image sensor(s). The iterations may be performed, for example, as the image sensor is moved relative to the target object (e.g., person wears the helmet described herein as is walking relative to the target object) and/or as the target object moves relative to the image sensor.

Referring now back to FIG. 3, image 302 captured by a camera in which illumination 304 by steerable laser 305 reduces confidence of a detector model's detection of target object 306. Image 302 depicts a green laser (532 nm) which was steered by MEMS mirrors. The steerable laser, camera, and processor may be installed on a helmet. The processor may analyze images depicting several cables 308 connected to equipment with ports 310 to identify a specific port 306 into which another cable is to be connected by a technician. The detector model automatically detects port 306 in image 302, as indicated by a square overlaid over port 306. The detection of port is used to guide the steerable laser. Now, as illumination 304 is advanced closer to port 306 to mark the port to the technician, the bright illumination 304 in image 302 may "blind" the camera, which reduces the detector model's confidence in detecting port 306, which may lead to an incorrect port identification, which may lead to the laser being steered towards to the wrong port. Filtering out illumination 304 from image 302 restores the detector model's confidence of detecting target object, i.e., port 306.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant steerable lasers will be developed and the scope of the term steerable laser is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for guiding a steerable laser to a target object, comprising:
   at least one processor executing a code for:
   for each image of a plurality of images captured by an image sensor and obtained in a plurality of iterations:
      filtering an illumination of a steerable laser overlapping a target object or in near proximity to a target object from the image, to create a filtered image;
      detecting the target object on the filtered image by a detector model; and
      generating instructions for at least one of: further directing of the steerable laser for illumination of the target object, and maintaining the illumination of the steerable on the target object';
   activating the steerable laser for illumination when a first image depicting the illumination is being captured;
   analyzing a location of the illumination depicted in the first image for tracking a current location of the steerable laser and/or for feedback in controlling the steerable laser; and
   non-activating the steerable laser when a second image is being captured, wherein the filtered image is created from the second image for analysis by the detector model
   wherein analyzing the location of the illumination comprises registering the first image with the second image, and comparing the location of the illumination depicted in the first image with the location of the target object detected in the second image, for determining whether the illumination corresponds to the expected orientation of the steerable laser.

2. The system of claim 1, further comprising code for detecting the illumination within the image, and creating the filtered image by digitally removing the detected illumination.

3. The system of claim 2, wherein the illumination generates a preset pattern, and detecting the illumination comprises detecting the preset pattern.

4. The system of claim 1, wherein the illumination of the steerable laser overlapping the target object or in near proximity to the target object depicted in the image reduces confidence of the detector model's detection of the target object in comparison to confidence of detection of the target object in an image that excludes the illumination and/or in which the illumination is non-overlapping the target object and is not in near proximity to the target object.

5. The system of claim 1, wherein confidence of the detector model's detection of the target object in the filtered image is higher than confidence of the detector model's detection of the target object in the image prior to the filtering.

6. The system of claim 1, further comprising the steerable laser and the image sensor.

7. The system of claim 6, wherein the at least one processor, the steerable laser, and the image sensor are installed on a helmet in a fixed position with no relative movement between the steerable laser and the image sensor.

8. The system of claim 6, wherein the at least one processor and the image sensor are of a smartphone, the steerable laser is on a back of the smartphone where the image sensor is installed, and further comprising a prism oriented for capturing images by the image sensor that are aligned with a beam generated by the steerable laser.

9. The system of claim 1, further comprising code for dynamically reducing intensity of the illumination of the laser to a level that remain visible to a human eye to detect and in which the detector model detects the target object in images depicting the reduced intensity of illumination with a confidence above a threshold.

10. The system of claim 1, further comprising a notch filter set to an emission band of the steerable laser, the notch filter placed in an optical path from the target object to the image sensor.

11. The system of claim 1, wherein non-activating comprises reducing intensity of the steerable laser to a level that remains visible to a human eye and that increases confidence of the detector model above a value for images with higher intensity of the steerable laser.

12. The system of claim 1, wherein the steerable laser illuminates within a first wavelength range, and the image sensor captures images at a second wavelength that is non-overlapping with the first wavelength.

13. The system of claim 12, wherein the first wavelength range is within the visible light range, and the second wavelength range is within at least one of near infrared (NIR) and short wave infrared (SWIR).

14. The system of claim 1, wherein the steerable laser illuminates within a wavelength range of a color within the visible light range, and further comprising a filter that filters the wavelength range of the color, the filter positioned for filtering light on a path from the target object to the image sensor, and wherein the detector model is designed and/or trained for processing images that exclude the wavelength range of the color.

15. The system of claim 1, further comprising code for inversely-synchronizing the image sensor and the steerable laser, by modulating the steerable laser for activating the steerable laser when the image sensor is not capturing the image and non-activating the steerable laser when the image sensor is capturing the image.

16. A system for guiding a steerable laser to a target object, comprising:
   at least one processor executing a code for:
   for each image of a plurality of images captured by an image sensor and obtained in a plurality of iterations:
      filtering an illumination of a steerable laser overlapping a target object or in near proximity to a target object from the image, to create a filtered image;
      detecting the target object on the filtered image by a detector model;

detecting the illumination within the image, and creating the filtered image by digitally removing the detected illumination; and generating instructions for at least one of: further directing of the steerable laser for illumination of the target object, and maintaining the illumination of the steerable on the target object;

wherein the detected illumination is removed by replacing pixel values depicting the illumination with pixel values representing background behind the illumination, obtained by at least one of: extrapolating from pixels around the illumination that represent background, and from a location on a preceding image corresponding to the illumination on the image, the preceding image obtained prior to the steerable laser directed to illumination at a current location.

17. A system for guiding a steerable laser to a target object, comprising:

at least one processor executing a code for:

for each image of a plurality of images captured by an image sensor and obtained in a plurality of iterations:

filtering an illumination of a steerable laser overlapping a target object or in near proximity to a target object from the image, to create a filtered image;

detecting the target object on the filtered image by a detector model;

generating instructions for at least one of: further directing of the steerable laser for illumination of the target object, and maintaining the illumination of the steerable on the target object;

predicting a future location of the illumination to be depicted in a future image;

extracting pixel values from a current location of a current image corresponding to the future location of the illumination, wherein the pixel values at the current location exclude the illumination;

obtaining the future image; and creating the filtered image by replacing pixels corresponding to the future location of the future image with the extracted pixel values.

* * * * *